(12) United States Patent
Willeke, Jr. et al.

(10) Patent No.: US 6,585,011 B2
(45) Date of Patent: Jul. 1, 2003

(54) SQUEEGEE BUCKET FLUID FILL DEVICE AND SYSTEM

(75) Inventors: Robert Willeke, Jr., Cocoa, FL (US); Dale A. Severson, Eagan, MN (US); Jeffery M. Eliason, Shoreview, MN (US); Scott Meyerson, Mounds View, MN (US)

(73) Assignee: Clean Shield Enterprises, Inc., Cottage Grove, MN (US)

( * ) Notice: Subject to any disclaimer, the term of this patent is extended or adjusted under 35 U.S.C. 154(b) by 0 days.

(21) Appl. No.: 10/100,441

(22) Filed: Mar. 18, 2002

(65) Prior Publication Data

US 2002/0174910 A1 Nov. 28, 2002

Related U.S. Application Data

(60) Provisional application No. 60/276,611, filed on Mar. 16, 2001.

(51) Int. Cl.$^7$ ................................. B65B 1/04
(52) U.S. Cl. .................. 141/95; 141/198; 141/18; 151/220.1; 151/121; 220/735
(58) Field of Search ............ 141/95, 198, 83, 141/98, 67, 2, 18; 15/220.1, 121, 236.02, 245; 220/735, 736

(56) References Cited

U.S. PATENT DOCUMENTS

| | | | |
|---|---|---|---|
| 1,346,898 A | | 7/1920 | Kingsbury |
| 2,162,314 A | | 6/1939 | Perri |
| 3,037,707 A | | 6/1962 | Ligon |
| 3,368,580 A | | 2/1968 | Carter |
| 3,477,408 A | | 11/1969 | Mull |
| 4,143,792 A | * | 3/1979 | Rex ................ 221/97 |
| 4,153,011 A | | 5/1979 | Weissman et al. |
| 4,202,294 A | | 5/1980 | Kasai |
| 4,962,730 A | | 10/1990 | Schafer |
| 5,052,343 A | | 10/1991 | Sushelnitski |
| 5,076,009 A | * | 12/1991 | Cibor ................ 47/40.5 |
| 5,452,683 A | | 9/1995 | Poffenroth |
| 5,513,677 A | * | 5/1996 | McCurry ................ 141/1 |
| 5,813,363 A | | 9/1998 | Snelling |
| 5,960,513 A | | 10/1999 | Beshah |
| 6,036,388 A | * | 3/2000 | Atcher ................ 401/118 |
| 6,230,939 B1 | | 5/2001 | Willeke et al. |
| 6,311,873 B1 | | 11/2001 | Willeke et al. |

OTHER PUBLICATIONS

Clean Shield Brochure, (No date).

* cited by examiner

Primary Examiner—Steven O. Douglas
(74) Attorney, Agent, or Firm—Fredrikson & Byron P.A

(57) ABSTRACT

Systems and sub-systems for supplying squeegee buckets with automobile windshield washer fluid. Some systems include a fluid containing reservoir elevated above the squeegee buckets so as to gravity feed the buckets. One system includes a fluid quantity sensor coupled to a squeegee bucket for indicating a predetermined low fluid quantity in the squeegee bucket, calling for the addition of fluid. The fluid quantity sensor can be coupled directly or indirectly to a controllable fluid supply source to add fluid into the squeegee bucket interior. Some systems have continuous or analog fluid quantity sensor outputs while other systems have discreet fluid quantity sensors indicating that a low limit has been reached. Some systems utilize level sensors while other systems utilize weight sensors. One system includes a level sensor in the form of a float adapted to trigger an electrical switch upon reaching a low level. When the low level limit is reached, a valve in fluid communication with a fluid supply source is opened to allow fluid flow into the squeegee bucket interior. Some systems allow a predetermined time flow of fluid or a predetermined volume flow of fluid. Other systems terminate flow into the squeegee bucket when a high level fluid quantity is indicated, for example, by a high level limit being reached by a level switch. Systems can also include logic within controllers to detect leakage and/or pilferage and further logic to limit or stop excessive fluid usage through pilferage or leakage. The invention allows continuous replenishing of windshield washer squeegee buckets, not requiring frequent human action to refill the buckets. The present invention can be used in lightly staffed or completely unstaffed, 24-hour gasoline service stations and convenience stores, providing windshield washer fluid with minimal personnel costs.

54 Claims, 12 Drawing Sheets

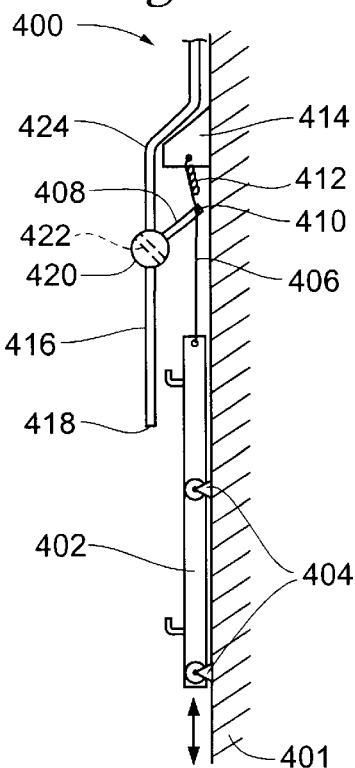
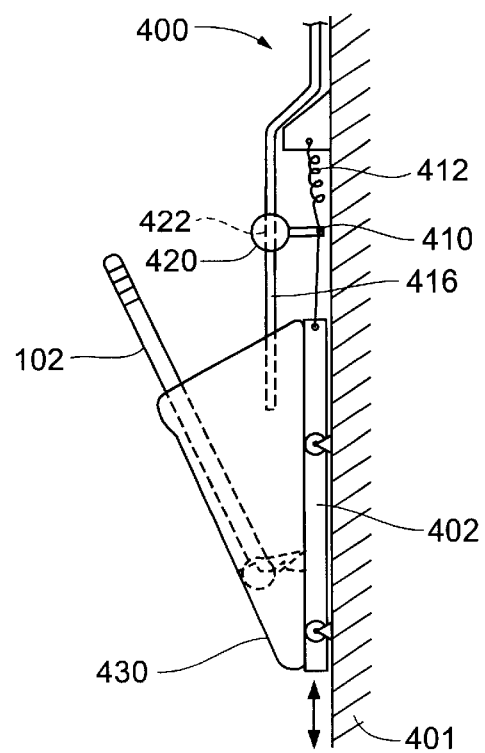
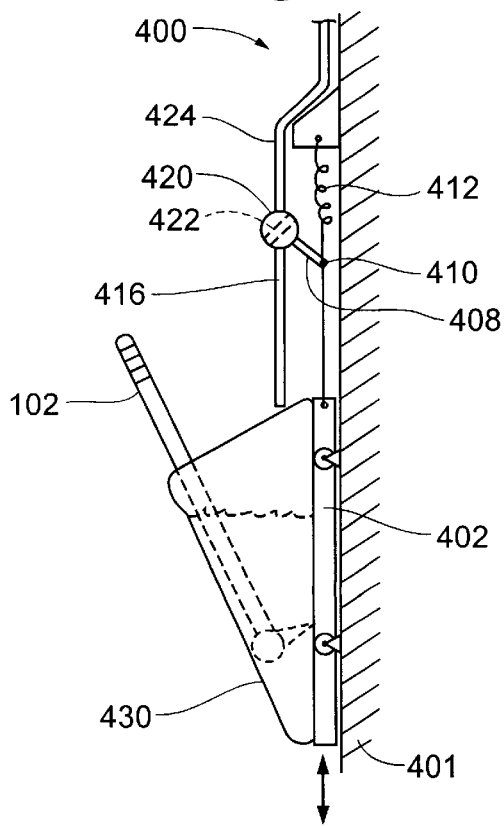

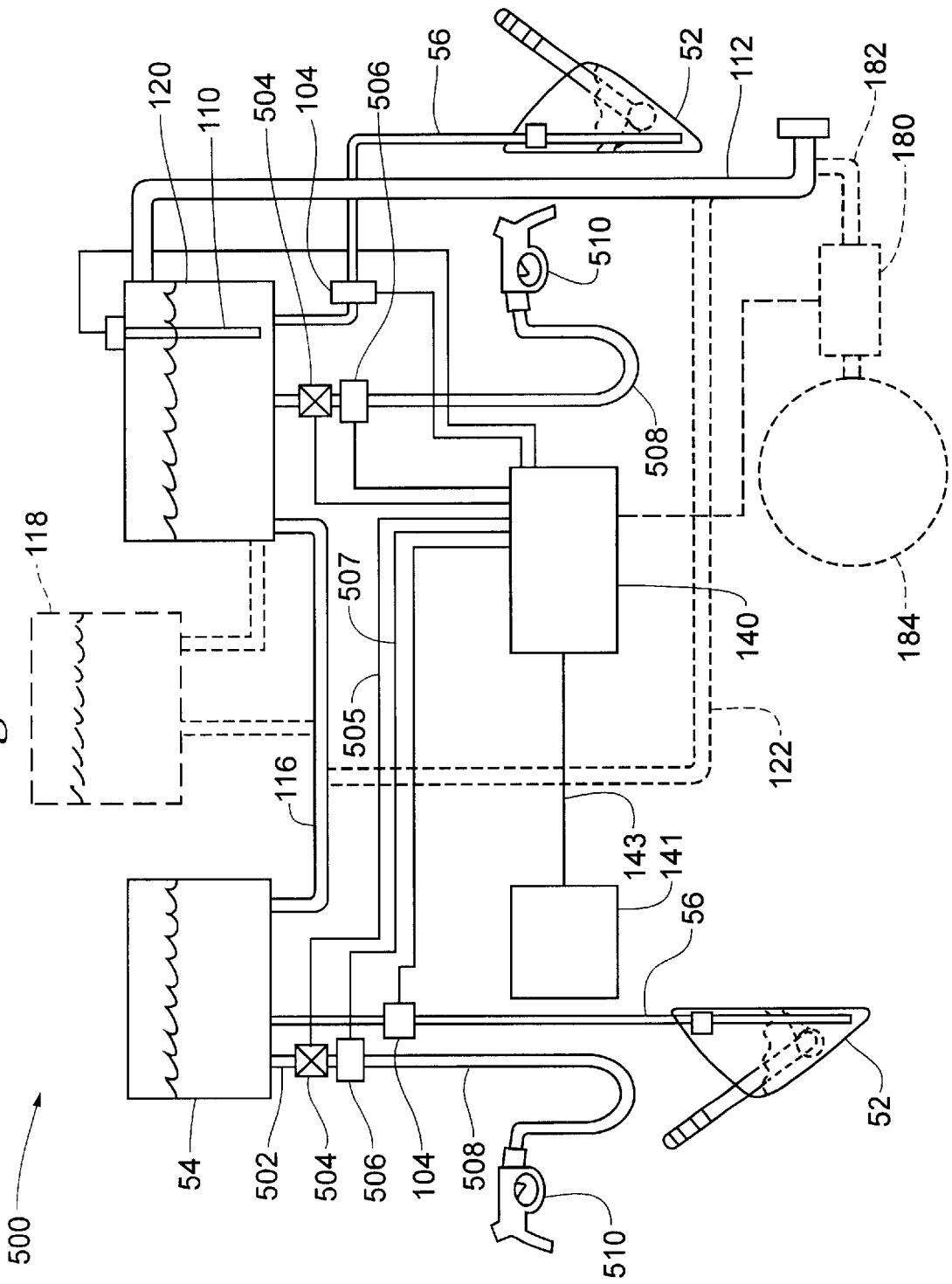

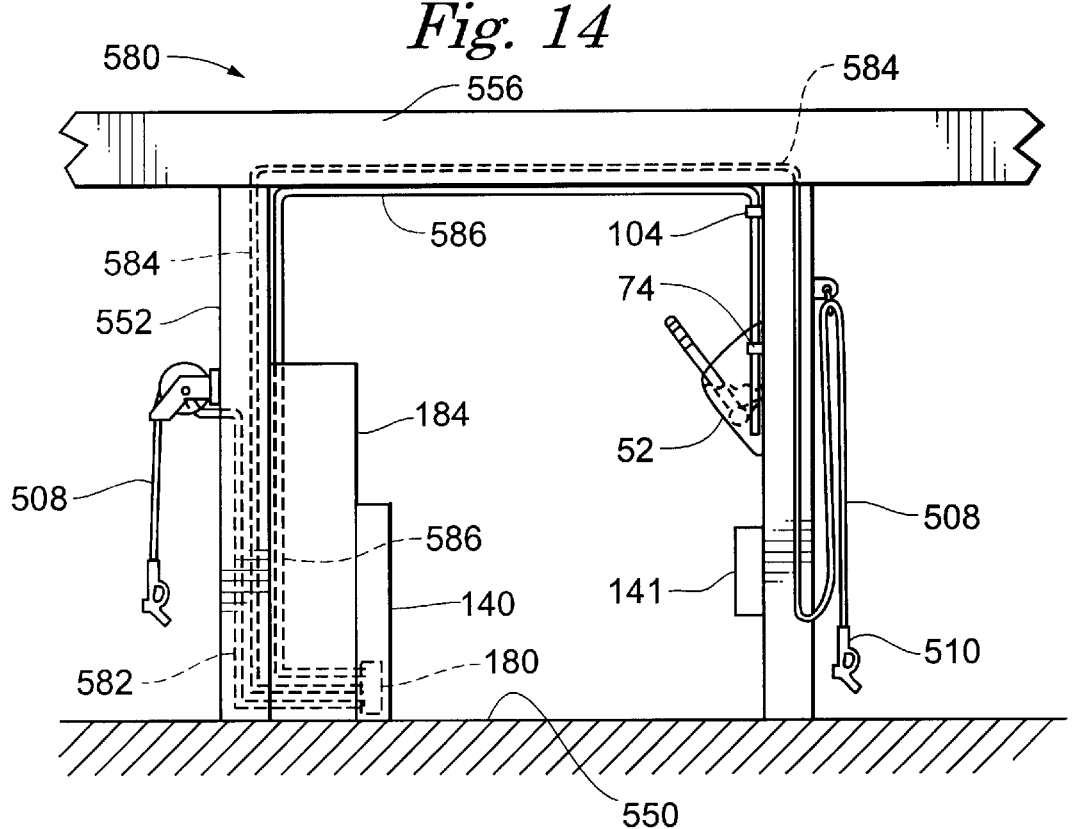
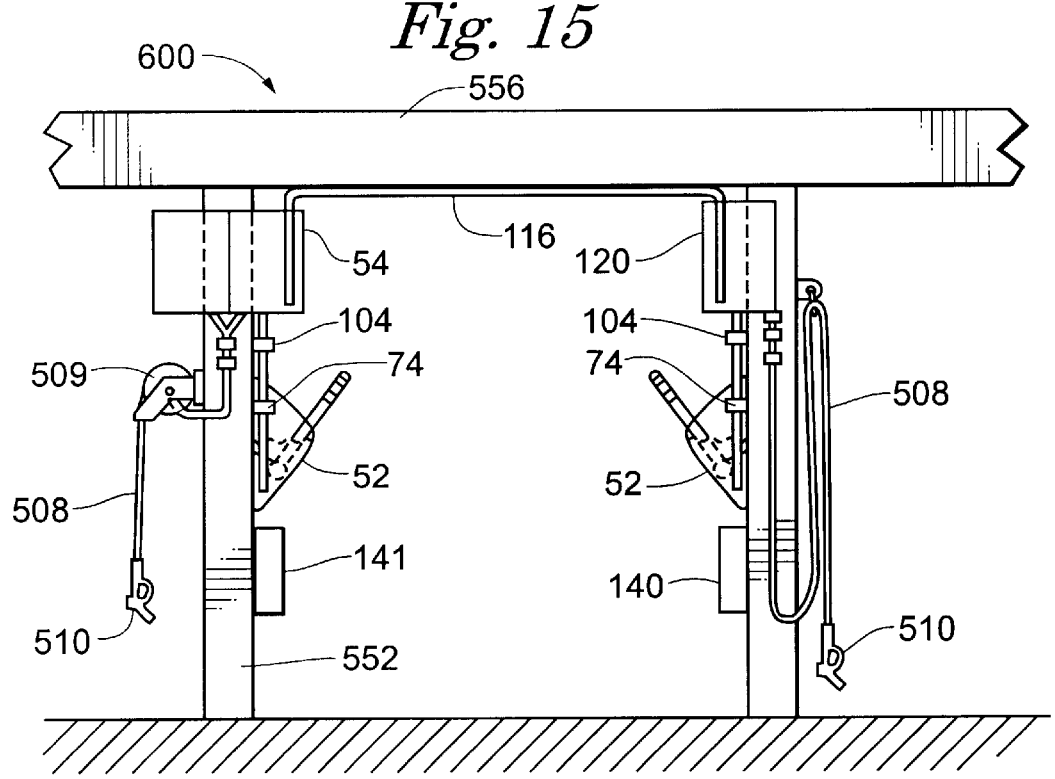

SQUEEGEE BUCKET FLUID FILL DEVICE AND SYSTEM

RELATED APPLICATIONS

The present application claims priority to U.S. Provisional patent application serial No. 60/276,611, filed Mar. 16, 2001, entitled AUTOMATIC KEEP FILL SYSTEM FOR WINDSHIELD WASHER FLUID SQUEEGEE BUCKETS, herein incorporated by reference in its entirety.

FIELD OF THE INVENTION

The present invention relates generally to windshield washer squeegee buckets commonly found at gas stations or convenience stores. More specifically, the invention includes apparatus and methods for automatically maintaining the level of windshield washer fluid within the squeegee buckets.

BACKGROUND OF THE INVENTION

In recent decades, gas stations have evolved from full service gas stations having the attendant pumping gasoline to current self-service gas stations where the customer pumps their own gasoline. This has allowed service station operators to lower their costs and to expand their sales by moving toward the convenience store model, selling other items in addition to gasoline. The shift from full service to self-service and convenience store has shifted the washing of windshields from attendant to customer. The gasoline stations commonly provide a container or bucket filled with windshield washing or cleaning fluid, and a squeegee where the customer can dip the squeegee into the bucket to saturate the squeegee sponge and provide sufficient fluid to clean the windshield and other vehicle windows. It is common for a gas station or convenience store to have several windshield washing fluid squeegee buckets, usually positioned at each fuel pump, or at each cluster of fuel pumps. Squeegee buckets are discussed in U.S. Pat. Nos. 6,230,939 and 5,960,513, while windshield washing fluid dispensing systems are discussed in U.S. Pat. No. 6,311,873, all of which are herein incorporated by reference.

The squeegee sponges remove windshield washer fluid from the squeegee bucket to clean the windshields and windows, thereby depleting the windshield washer fluid supply in the squeegee bucket. The emptying of the squeegee buckets thus requires periodic replenishing of fluid. This requirement to replenish the fluid presents a problem in that the attendant must leave the cash register area to refill the buckets. Additionally, the fluid used to replenish is often obtained by opening a bottle of product from a retail shelf within the gasoline station or convenience store, creating inventory discrepancy issues. To further complicate matters, the attendant is often unable to replenish the fluid in the squeegee buckets. In some situations, the attendant is working alone, and is not allowed to leave the cash register. In other situations, there is no attendant, as the gasoline pumps are unattended for hours or even days at a time, as the pumps are entirely self-service, taking credit cards and dispensing gasoline.

The fluid squeegee buckets are thus often not replenished, leaving dissatisfied customers, as one or all buckets are empty of fluid. Even when having some fluid, the grit, road grime, and bugs are continually carried from the windshields into the squeegee bucket, with the grime and grit building up to substantially dirty the remaining fluid.

What would be desirable is a system for automatically replenishing the windshield washer fluid in the squeegee buckets, requiring much less human intervention. What would also be desirable is a system for automatically filling windshield washer squeegee buckets while allowing removal of the buckets for cleaning dirt and other foreign matter accumulated within the buckets.

SUMMARY OF THE INVENTION

The present invention provides systems and sub-systems for maintaining a prescribed level of windshield washer fluid in one or more windshield washer fluid squeegee buckets, with the fluid being fed from an elevated reservoir disposed above the squeegee buckets in some systems. The squeegee buckets can include fluid quantity sensors such as level sensors or weight sensors giving an indication of the quantity of fluid contained within the squeegee buckets. Upon reaching a prescribed low level or low quantity of fluid, systems according to the present invention cause windshield washer fluid to be added to the squeegee bucket requiring fluid.

The present invention includes a system for supplying windshield washer fluid to squeegee buckets, the system including a squeegee bucket for holding windshield washer fluid, a fluid quantity sensor operably coupled to the squeegee bucket for indicating fluid quantity in the bucket, a fluid supply conduit operably coupled to the squeegee bucket interior, a fluid supply source coupled to the fluid supply conduit, and a controller having an input coupled to the fluid quantity sensor and an output operably coupled to at least one of the fluid supply conduit and fluid supply source. The controller output can cause fluid to be supplied to the squeegee bucket through the fluid supply conduit responsive to a low quantity indication from the fluid quantity sensor. In one system, a fluid supply source includes a pump in fluid communication with both the fluid supply conduit and a fluid storage vessel. In another system, the controller output is operably coupled to a pump. In a preferred system, the fluid supply source includes a fluid reservoir coupled to the fluid supply conduit and disposed to gravity feed the squeegee bucket.

In a preferred embodiment, the system includes a valve coupled to the fluid supply conduit to allow fluid flow through the conduit in a first position and to preclude fluid flow through the conduit in a second position. The controller output can be operably coupled to open and close the valve.

In one system, the fluid quantity sensor includes a vertically slidable mounting bracket for the squeegee bucket mounted to a surface and connected directly or indirectly to a spring, such that having more fluid in the squeegee bucket causes the spring to extend, allowing the bucket to lower. In this embodiment, the controller can include a lever arm coupled directly or indirectly to the spring to move with the changed elongation of the spring. The lever arm can further be linked to a valve for supplying fluid into the squeegee bucket interior. When the combined squeegee bucket and fluid weight drops below a preset fluid quantity or weight limit, the lever arm can move to open the valve and allow fluid flow into the squeegee bucket interior. As the squeegee bucket becomes heavier, the spring can extend, moving the lever arm in the opposite direction to close the valve.

In another system, the fluid quantity sensor includes a level sensor such as a float sensor. In one embodiment, the float sensor is adapted to electrically signal a low fluid level condition, which can be used directly or indirectly to open a fluid supply valve to provide fluid into the squeegee bucket interior. In one system, the float switch electrical output is used directly to trigger a valve for a preset time period to allow a given quantity or aliquot of fluid to be dispensed into the bucket interior. In another embodiment, the float switch signal is fed to a controller, which in turn opens a valve to allow fluid to flow into the squeegee bucket interior. In yet another embodiment, the float switch output is fed to the inflow valve to open the valve until the low level condition is no longer indicated.

The system can also include fluid reservoirs mounted in an elevated position above the squeegee bucket so as to gravity feed the buckets. In one system, the reservoirs are mounted on the support columns near a gasoline pump on a service island. In another system, the reservoirs are mounted atop the canopy of a service station island. Some systems have multiple fluid reservoirs interconnected with fluid equalization conduits, allowing the level of the multiple reservoirs to be equalized, thereby allowing heavier used or smaller reservoirs to be replenished from less used or larger reservoirs.

One system utilizes a dual reservoir system including an upper reservoir open or vented to the atmosphere feeding a lower reservoir acting as a second stage siphon tank which can be closed to the atmosphere through operation of valves above and below the siphon tank. A fluid supply conduit can extend downward from the siphon tank and into a squeegee bucket, extending below the fluid level in the squeegee bucket interior. When the fluid level of the squeegee bucket drops below the lower extent of the fluid supply tube from the siphon tank, air can bubble up into the siphon tank, thereby allowing fluid from the siphon tank to drop down through the fluid supply conduit into the squeegee bucket. This can continue until the squeegee bucket fluid level is above the lower extent of the fluid supply conduit extending down from the siphon tank. After the siphon tank is low or empty, the siphon tank outflow valve can be closed and the siphon tank inflow valve opened, to allow replenishing fluid to enter from an upper reservoir or pump. The siphon tank inflow valve can then be closed and the siphon tank outflow valve opened to repeat the process.

Systems can also include controllers for controlling operation of the fluid supply at both a local and supervisory level. The controller can be used to open and close valves as well as to perform monitoring functions. Some systems utilize controllers to detect excessive fluid flow over a predetermined time interval. The excessive fluid flow may indicate leakage and/or pilferage of the washer fluid. Some systems include data output functions as part of the controller. In these systems, the system may report out fluid usage, frequency of usage, excessive fluid use alarms, as well as fluid bulk storage tank low levels indicating a need for more washer fluid. In some systems, the reservoirs used to fill the squeegee buckets are also used to supply hoses which can be used to fill the washer fluid reservoirs in automobiles.

DESCRIPTION OF THE DRAWINGS

FIG. 4A is a schematic diagram of a squeegee bucket-mounting bracket, which is vertically slidable and coupled to a spring and a valve lever arm;

FIG. 4B is a schematic diagram of the squeegee bucket mounting bracket of FIG. 4A, having a low fluid quantity within the bucket, causing the spring to contract and the lever arm to open the valve to replenish the fluid in the squeegee bucket;

FIG. 4C is a schematic diagram of the squeegee bucket of FIG. 4B, after fluid replenishment, the fluid weight causing the spring to extend and pull the lever arm downward to close the fluid in-flow valve;

FIG. 6B is a schematic diagram of the squeegee bucket of FIG. 6B, shown after fluid replenishment, the spring contracted to electrically indicate the fluid level is not low;

FIG. 7 is a schematic diagram of a squeegee bucket fluid replenishment system having a dispensing valve for dispensing windshield washer fluid;

FIG. 14 is a fragmentary, highly diagrammatic side view of a gasoline station island having a ground level reservoir and pump for replenishing the squeegee bucket fluid; and FIG. 15 is a fragmentary, highly diagrammatic side view of a gasoline station island having reservoirs disposed below the canopy and having an inter-reservoir fluid equalization conduit disposed between the reservoirs.

DETAILED DESCRIPTION OF THE PREFERRED EMBODIMENTS

The following detailed description should be read with reference to the drawings, in which like elements in different drawings are numbered identically. The drawings, which are not necessarily to scale, depict selected embodiments and are not intended to limit the scope of the invention. Several forms of invention have been shown and described, and other forms will now be apparent to those skilled in art. It will be understood that embodiments shown in drawings and described above are merely for illustrative purposes, and are not intended to limit scope of the invention as defined in the claims, which follow.

Figure 1A:
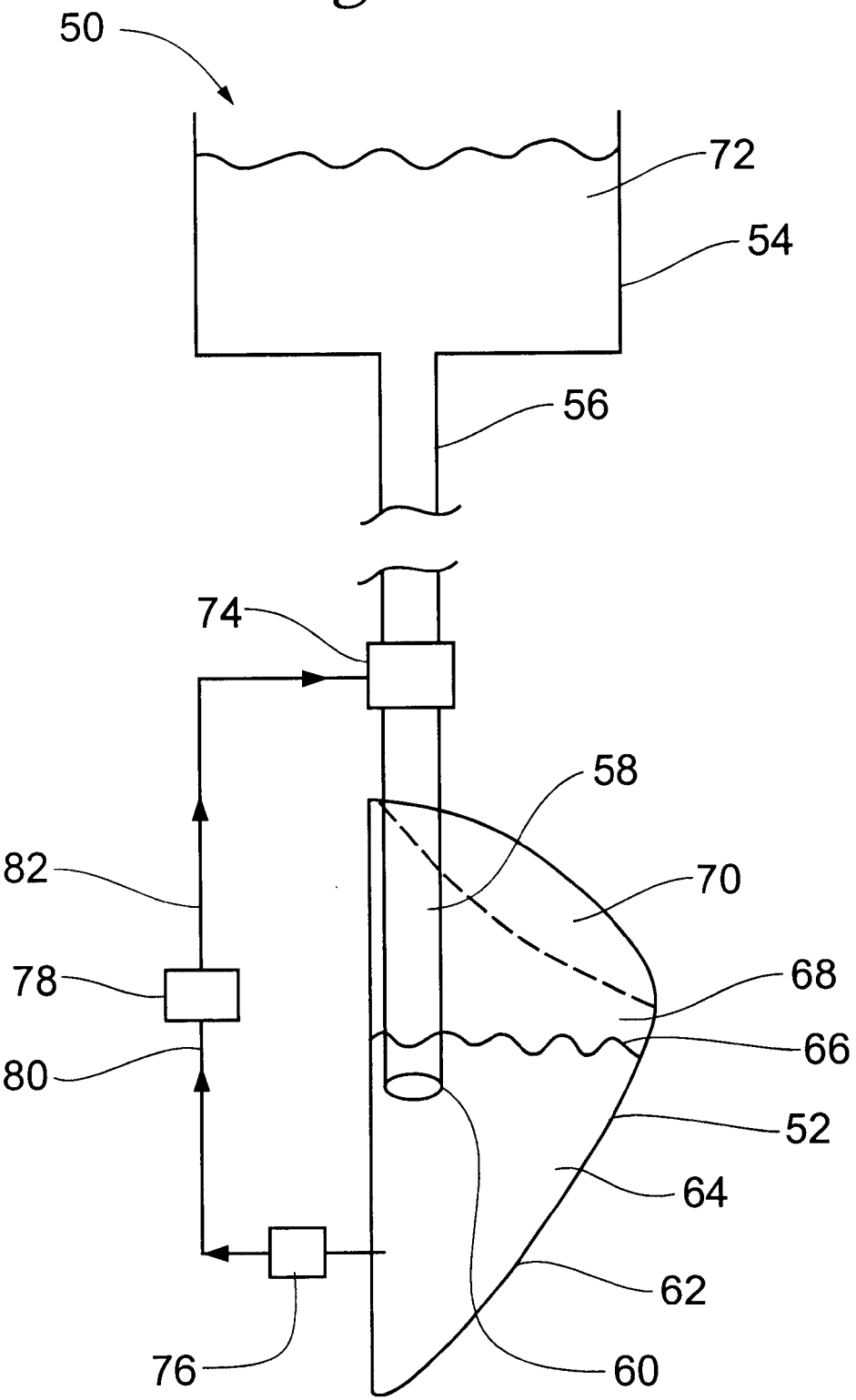
FIG. 1A is a schematic view of a windshield washer fluid replenishment system including a squeegee bucket gravity fed from an elevated reservoir.

FIG. 1A illustrates a squeegee bucket fill system or subsystem 50. System 50 may also be viewed as a subsystem as, in some embodiments, other elements are present, being added to the system or subsystem 50. System 50 and the other systems in the present application may also be referred to as "Stay Fill" systems, as the systems enable squeegee buckets to stay filled. System 50 includes a reservoir or fluid supply source 54 containing windshield washer fluid or windshield cleaner fluid 72. As will be discussed later, reservoir 54 may be open to the atmosphere at the top, or closed and valved at the top, depending on the system. As used herein, the term "fluid" refers to windshield washer fluid, glass cleaner fluid, and, in a less preferred embodiment, water.

Reservoir 54 can feed into a fluid supply conduit 56 which further feeds into a squeegee bucket level control valve or inflow valve 74, which further feeds downward into a lower portion of the fluid supply conduit which can be viewed as a separate tube, forming a squeegee bucket fluid tube 58. Valve 74 can be located either inside of or outside of the squeegee bucket. In some embodiments, valve 74 is located outside of the bucket, and disposed to drop fluid through another aperture into the bucket interior. Squeegee bucket fluid tube 58 can terminate in an open port 60, for adding fluid to the squeegee bucket.

A squeegee bucket 52 may be seen to include a body 62 defining a bucket interior 68 and having a bucket aperture 70 which can be used to admit a squeegee (not shown in FIG. 1A). Squeegee bucket 52 includes fluid 64 having a fluid level 66, and the bucket may be seen to include a quantity of fluid, which may be quantified by the level, volume, or weight of the fluid, either alone or together with the weight of the squeegee bucket. As used herein, the term "squeegee bucket" refers to a container capable of containing windshield washer fluid and having an aperture through the squeegee bucket for admitting a squeegee handle. Squeegee buckets are commonly found in gasoline stations and convenience stores, which sell gasoline.

A local fluid level controller can be used to control the level of fluid in squeegee bucket 52. The squeegee bucket level controller may also be referred to as a squeegee bucket fluid quantity controller, as the amount of fluid in the squeegee bucket is to be controlled, which can be accomplished in many ways, as described in detail below. The terms "fluid level controller" and "fluid quantity controller" should be considered as interchangeable with each other in the present application. A fluid quantity sensor 76 can be used to sense the quantity of fluid in squeegee bucket 52. Controller 78 may also be referred to as control linkage or linkage between the low fluid quantity sensor and the valve for admitting fluid into the squeegee bucket The fluid quantity sensor in some embodiments senses a continuous range of fluid quantities, and outputs a signal having a continuous range of values indicating the quantity of fluid in the squeegee bucket. Some fluid quantity sensors may output analog electrical signals, for example, a range of voltages or currents. Other continuous fluid quantity sensors may output a digital signal having effectively a continuous range of values, limited by the resolution of the number of bits. Some embodiments of fluid quantity sensors output discreet values, for example, a low level signal and/or a high level signal. Some fluid quantity sensors output a discreet value indicating a low—low signal, as will be explained further below. Still other fluid quantity sensors output several discreet values indicating discrete fluid quantities. One such example of a fluid quantity sensor outputs a series of discreet signals, spaced at substantially regular intervals from a low—low value to a high value. One such system outputs a discreet level signal for every 20 percentage points between a very low fluid quantity level and a very high fluid quantity level.

Fluid quantity sensor 76, in some systems, measures weight directly. Some systems measure the combined weight of the fluid together with the squeegee bucket. Some systems may effectively tare the bucket weight to allow reading the fluid weight directly. Fluid quantity can also be measured by the pressure or head of the fluid in the squeegee bucket. Fluid quantity sensor 76 can indicate the level of fluid, for example, through a float switch or other level gauging systems well known to those skilled in the art. One system utilizes a float switch for the fluid quantity sensor, which is directly wired to valve 74, with the electrical linkage serving as the controller. Valve 74 may remain open until the low level signal goes away.

Controller 78 can include an input 80 coupled to fluid quantity sensor 76 and an output 82 coupled to squeegee bucket level control valve 74. Squeegee bucket level control valve 74 may also be referred to as a squeegee bucket inflow control valve 74 in some systems. Fluid level controller 78 may be any suitable control device or element and can be microprocessor based, electrically based, mechanically based, or even pneumatically based, depending on the embodiment. A mechanical or electrical linkage between sensor 76 and valve 74 can serve as the controller in some systems.

In use, the customers using the squeegee bucket can remove fluid from the bucket, thereby depleting the fluid level. Some fluid is also lost through evaporation. As fluid level 66 drops, fluid quantity sensor 76 senses the fluid level and sends the fluid quantity sensed to controller input 80. Controller 78 can then send an output signal through controller output 82 to squeegee bucket inflow valve 74, to open valve 74. Fluid can exit reservoir 54 through fluid supply conduit 56, passing through valve 74 and further through squeegee bucket fluid tube 58, exiting through port 60 into the squeegee bucket 52. As the level becomes sufficiently high, the level is sensed by fluid quantity sensor 76, sent to controller 78, which can then close valve 74 through output signal 82. It should be noted that squeegee bucket fill system 50 employs a gravity feed system to provide fluid to squeegee bucket 52. As used herein, the term "gravity feed" refers to a system in which a fluid reservoir disposed higher than the squeegee bucket provides fluid through a conduit into the bucket through the force of gravity. Fluid reservoirs can be located on service is/and support pillars o9r canopies, on other buildings, and atop embankments.

Figure 1B:
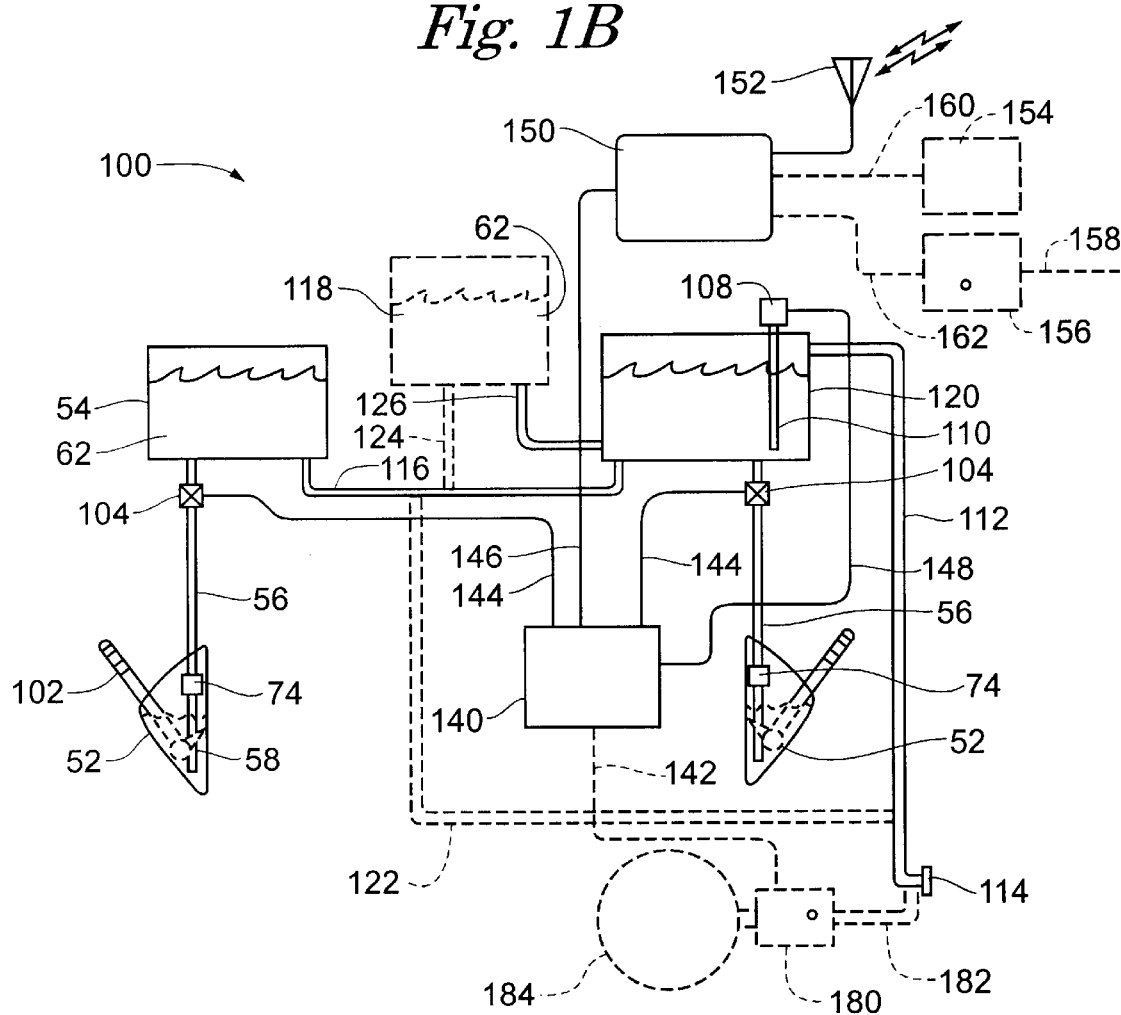
FIG. 1B is a schematic view of a windshield washer fluid replenishment system including two squeegee buckets each coupled to a reservoir through a fluid supply conduit and having a controller coupled to a level control valve, and a fluid quantity sensory to control the fluid level in the squeegee buckets.

FIG. 1B illustrates a squeegee bucket fill system 100, employing many of the elements previously described in FIG. 1A. Some elements have been omitted in FIG. 1B to simplify the drawing. In particular, fluid quantity sensor 76 and fluid level controller 78 have been left out of FIG. 1B to simplify the drawing. Squeegee bucket inflow valve 74 is illustrated in FIG. 1B and can be controlled through controller 78 or other similar device.

Squeegee buckets 52 are coupled through fluid supply conduit 56 as previously described. System 100 includes reservoir 54 as previously described as well as a second reservoir 120. Reservoir 120 can include a reservoir fluid quantity or level sensor 108 having a probe 110. Both reservoirs 54 and 120 can have the reservoir outflow controlled by reservoir outlet valves 104, in fluid communication with, and able to block fluid flow through, fluid supply conduit 56. As will be discussed further, reservoir outlet valves 104 can be used to reduce or stop pilferage, leakage, and can be used to stop fluid flow during squeegee bucket removal and cleaning.

In some embodiments, reservoir outlet valves 104 may be metering devices, for example, small metering pumps. In other devices, an additional and separate flow-metering device can be disposed in fluid communication with fluid supply conduit 56.

A third, optional reservoir or storage reservoir 118 is also illustrated in FIG. 1B. Optional reservoir 118 can be used to store additional fluid at substantially the same level as the other reservoirs, with reservoir 118 not being directly coupled to any squeegee buckets. Reservoirs 54 and 120 can be coupled through an inter-reservoir equalization conduit 116 connecting both reservoirs. Equalization conduit 116 can allow the fluid levels within various reservoirs to be equalized between the reservoirs, allowing a less used reservoir to effectively supply a more frequently used reservoir. Optional reservoir 118 includes a first outlet conduit 124 coupled to equalization conduit 116. Optional reservoir 118 may also be referred to as a storage reservoir. Storage reservoir 118 includes a second outlet conduit 126 coupled to reservoir 120. An optional reservoir fill conduit 122 can be coupled from pump 180 to equalization conduit 116.

The reservoirs themselves may be filled through a reservoir fill conduit 112 extending down to a reservoir fill conduit port 114. Reservoir fill conduit 112 can be used to periodically refill the reservoirs themselves using a variety of systems, including truck delivery. A bulk storage tank or vessel 184 may be seen coupled to a pump 180. Pump 180 can be further coupled through an outlet coupling 182 to reservoir fill conduit 112. Bulk storage tank 184 and pump 180 can thus be used to periodically replenish the reservoirs by pumping fluid within bulk storage tank 184 through fill conduit 112 to reservoir 120, and, indirectly, reservoir 54. System 100 also includes a controller or master controller 140. Controller 140 may be seen to include an output 142 coupled to pump 180 for starting and stopping the pump. Controller 140 may also be seen to have reservoir outlet valve control outputs 144 coupled to reservoir outlet control valves 104 for opening and closing the valves. Controller 140 is coupled to an input 148 coupled to the reservoir quantity or level sensor 108. Level input 148 can be used by controller 140 to determine when to fill the reservoirs. Finally, controller 140 can include a communication output 146 coupled to a communication unit 150.

Communication unit 150 can be used to communicate unidirectionally or bi-directionally with other communication systems remote from the service island, and often, remote from the service site itself. Communication unit 150 can be coupled to an antenna 152 for radio frequency communication. Communication unit 150 can also be coupled through its own output 160 to an infrared transceiver 154, for local transmission of data, for example, to the service station operator. Communication unit 150 can also be coupled through an output 162 to a telecom or Internet communication device 156, coupled to the outside world through a communication line 158. Communication line 158 can be used to report the need for additional bulk fluid, as well as to warn of likely pilferage or leakage. The radio frequency signal can be a proprietary system and protocol, or a standardized protocol and system, such as Blue Tooth or even cellular communications including voice or data cellular. Communication unit 150 can be used in conjunction with control unit 140, to communicate to a remote site that predetermined events have occurred. One such event is a low fluid level detected in a fluid reservoir. Another such event is the detection or inference of pilfering or leak detection. Communication unit 150 may also periodically transmit the amount of fluid dispensed, the time of fluid flow being dispensed, and the frequency of fluid being dispensed into the squeegee buckets. The absolute and average time between dispenses may also be reported.

Communication unit 150 can also be polled via remote system to ascertain system audit data. It should be noted that the remote system may be the supply vehicle used to periodically replenish reservoirs 54 and 120 or the option bulk storage tank 184, and can be optionally used during replenishing to indicate that the reservoir is full.

Figure 2:
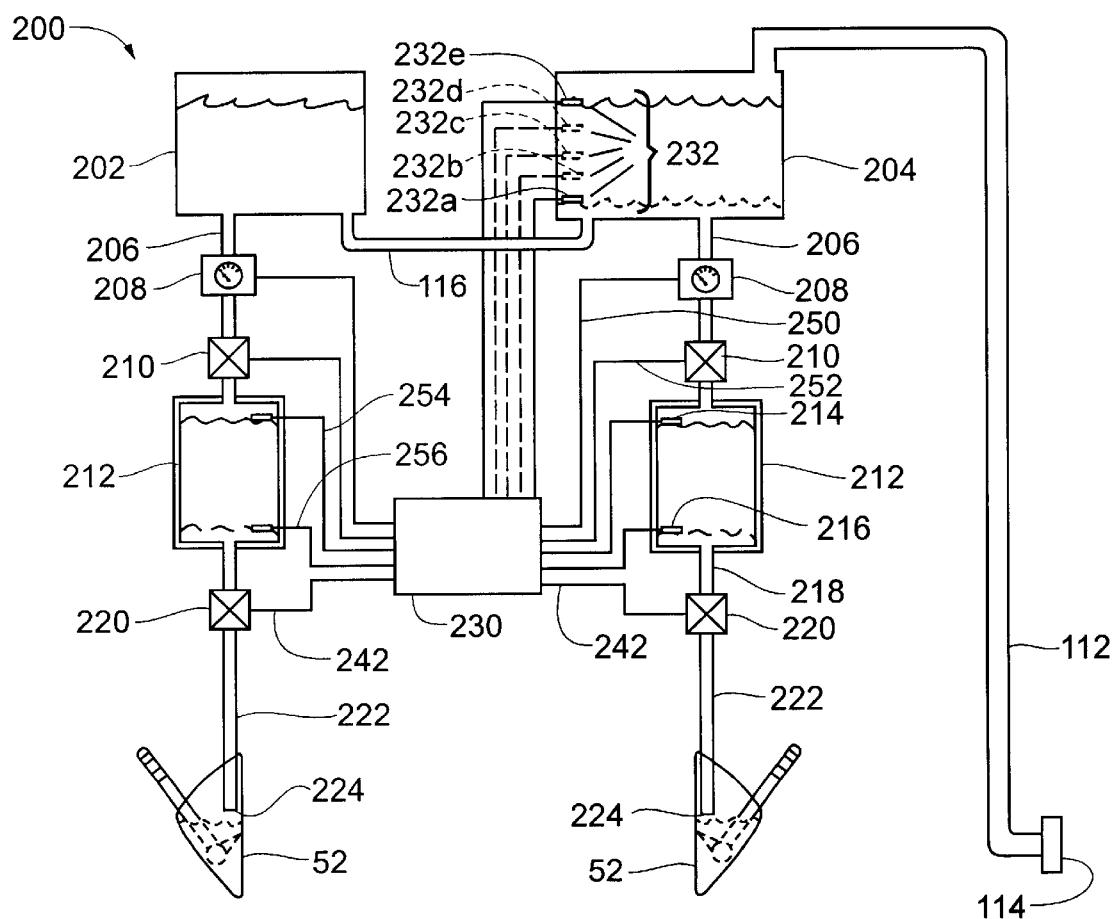
FIG. 2 is a schematic diagram of a windshield washer fluid replenishment system having lower reservoirs which can be closed to the atmosphere to act as siphon tanks, and having upper reservoirs coupled to each other through a fluid equalization conduit.

FIG. 2 illustrates a squeegee bucket fill system 200. Squeegee bucket fill system 200 includes squeegee buckets 52, as previously described. System 200, however, can have a different tube or conduit extending into the squeegee bucket as well as a second set of reservoir or siphon tanks, discussed below.

System 200 includes a first upper reservoir 202 and a second upper reservoir 204, with both reservoirs preferably being vented to the atmosphere. Reservoirs 202 and 204 may also be referred to as first stage siphon tanks. In many respects, reservoir tanks 202 and 204 are as previously described with respect to the reservoirs discussed in FIG. 1A. Reservoir 204 may be seen to have, as a reservoir level or quantity sensor, several discreet level sensors 232A–232E. Discreet level sensor 232A indicates a very low reservoir level, discreet sensor 232E indicates a very high reservoir level, with discreet sensors 232B–232D indicating intermediate levels. The discreet level sensors are referred to collectively as level sensor 232. The reservoirs 202 and 204 are coupled to reservoir outlet conduits 206, which can in turn in couple to flow meters 208.

System 200 also includes a second set of reservoirs, which can be referred to as lower reservoirs or as second stage siphon tanks 212. Reservoirs 212 may be seen to be closable to the atmosphere through the use of valves. Fluid can flow into reservoirs 212 through a lower reservoir inlet valve 210, and exit through a lower reservoir outlet conduit 218 and further through lower reservoir outlet valve 220. Valve 220 may also be referred to as the squeegee bucket inflow valve. Flow can continue through a squeegee bucket supply conduit 222 exiting finally through a squeegee bucket supply conduit outlet port 224 disposed within bucket 52. Lower reservoir 212 may be seen to have a lower reservoir fluid quantity sensor comprising a high level sensor 214 and a low level sensor 216.

A controller or master controller 230 may be seen coupled to the various sensors and valves. Upper reservoir level sensor 232 can be coupled through level input 233 to controller 230. Flow meter 208 can be coupled through controller flow input 250 while lower reservoir inflow valve 210 can be controlled through controller output 252. The lower reservoir fluid quantity sensors 214 and 216 can be read through controller inputs 254 and 256, respectively. Lower reservoir outlet valves 220 can be controlled through controller output 242.

The use of the siphon tanks 212 of system 200 may now be discussed. As illustrated in FIG. 2, the squeegee bucket supply conduits 222 and outlet port 224 may be slightly different than those found in the previously described system. In particular, the relationship between outlet port 224 and the fluid level within squeegee bucket 52 should be noted. System 200 embodies a system utilizing a two-stage siphon system having a tube feeding fluid into squeegee bucket 52. This is accomplished by the same principle as the inverted bottle in a pan of water. The water in the pan will rise until the lip of the bottle is reached and equilibrium is reached between the pressure inside and outside of the bottle. The pressure outside of the bottle is the atmospheric pressure, and the pressure inside is the combination of the fluid head, the air trapped in the bottle, and the neck of the bottle restricting flow. In the present invention, the neck of the bottle is effectively elongated to become the supply tube, and the body of the bottle becomes the second stage, siphon tank, or lower reservoir of the two-stage system. The upper reservoir is the first stage. As fluid is delivered to the bucket, through tube 222, air will enter the tube and travel to lower reservoir 212 until the fluid level in bucket 52 reaches and seals off the bottom of the tube or port 224. This will continue until lower reservoir 212 is emptied. When this occurs, the lower reservoir 212 is replenished and the air is purged. System 200 effectively uses a hydraulic linkage between the low fluid quantity and the fluid supply. The exposed tube port 224 acts as the low fluid quantity sensor, which is linked to the fluid source in reservoirs 212 by admitting air when the port is exposed.

In operation, upper reservoirs 202 and 204 may initially be filled. Lower reservoir outlet valve 220 may be closed, and lower reservoir inlet valves 210 opened, thereby allowing fluid to flow from upper reservoirs 202 and 204 through meters 208 and into lower reservoirs 212. When the lower reservoir high-level sensors 214 indicate the reservoirs are sufficiently full, lower reservoir inlet valves 210 may be closed. Lower reservoir outlet valves 220 may be opened, allowing fluid to flow through squeegee bucket supply conduit 222 and into squeegee buckets 52. As fluid is removed from the squeegee buckets, the fluid will flow into the squeegee buckets from the lower reservoirs 212, as previously described. When the lower reservoir low-level sensor 216 indicates that the lower reservoirs require replenishing, the lower reservoirs can be replenished as previously described. The control of the system, as just described, can be accomplished through controller 230. Controller 230 can be any combination of microprocessor-based control, PLC control, electrical control, hydraulic control, or even pneumatic control, using techniques well known to those skilled in the art. A controller using Boolean logic or binary logic may be referred to as a binary logic control linkage or linkage. A microprocessor based controller is considered to be a microprocessor control linkage or linkage for the purposes of the present invention. When controller 230 senses that the level within reservoirs 202 and 204 is sufficiently low, the fluid supply can be replenished through reservoir fill conduit 112, as previously discussed.

Flow meters 208 can be utilized to detect various situations requiring human or automatic attention. One such situation is pilferage or leakage. When the flow past meter 208 exceeds a preset limit over a given time period, this may indicate either leakage through tube 222 or pilferage. With presently available squeegee buckets, pilferage is not an issue as only a small amount of windshield washer fluid is present in the buckets. With the present system, however, 50 gallons or more of windshield washer fluid might be available for the taking, absent human intervention and/or automatic detection. Controller 230 may be used to effect the detection and prevention of pilferage and leakage. In particular, controller 230 may significantly restrict or stop outflow of fluid into the squeegee buckets when pilferage or leakage is inferred.

Figure 3:
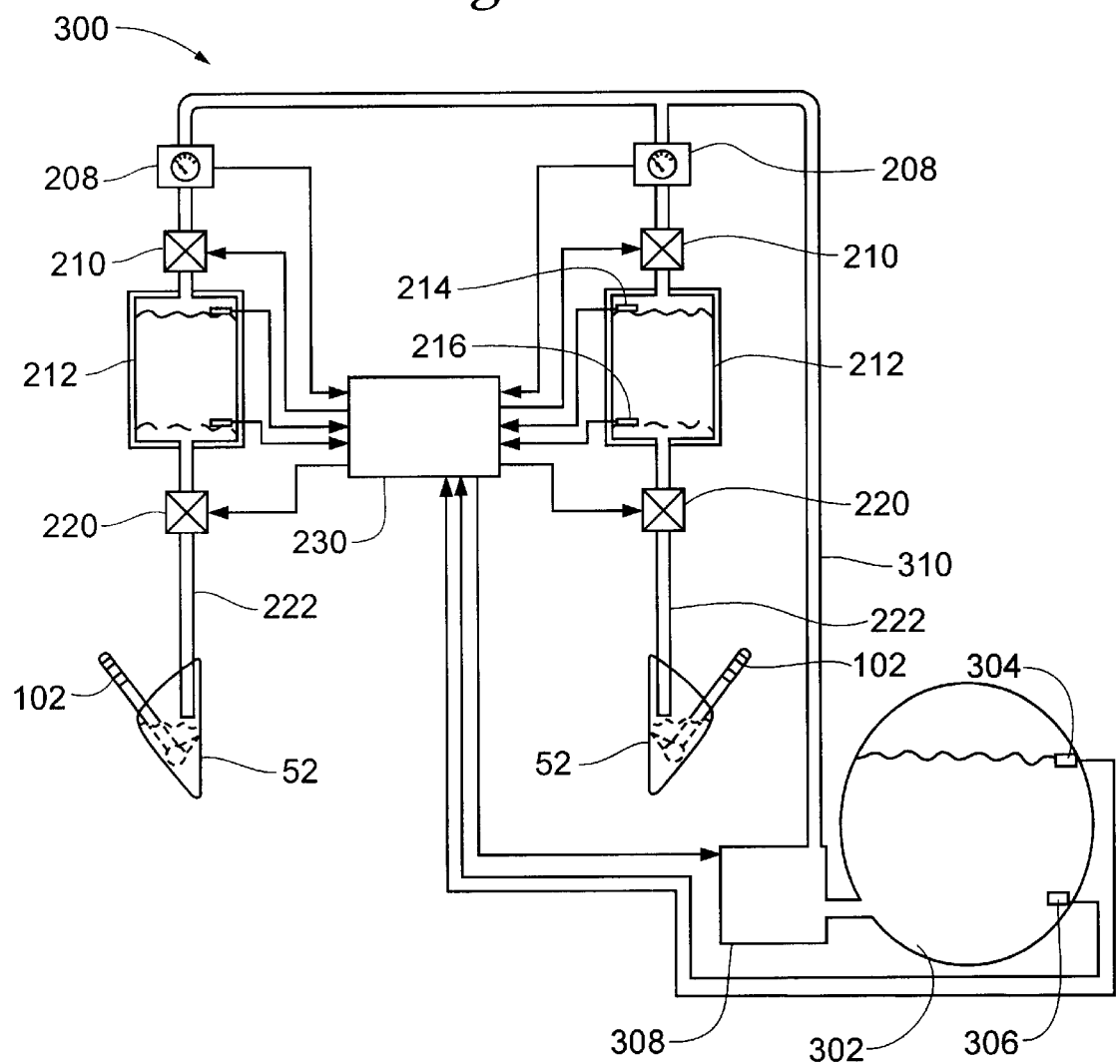
FIG. 3 is a schematic diagram of a windshield washer fluid replenishment system including closed reservoirs fed from a supply tank with a pump, with the closed reservoirs having fluid quantity sensors.

FIG. 3 illustrates another squeegee bucket fill system 300. System 300 is similar in many respects to the system 200 of FIG. 2. In particular, siphon tanks 212, together with meter 208, siphon tank inflow valve 210, siphon tank outflow valve 220, and squeegee bucket supply conduit 222 can be as described with respect to FIG. 2. Likewise, controller 230 can be similar to control 230 of FIG. 2, but may use slightly different logic.

System 300 has effectively replaced the upper reservoirs of FIG. 2 with a pump and bulk storage tank. System 300 includes a bulk storage tank 302 for storing fluid having a high level sensor 304 and a low level sensor 306. Both sensors may be coupled to controller 230. Bulk storage tank 302 is coupled to a pump 308 which is in turn coupled to a siphon tank fill conduit 310 which can be used to replenish the siphon tanks 212. When the siphon tanks level sensors 216 call for fluid replenishment, siphon tank inflow valve 210 may be opened, valve 220 shut, pump 308 started, and fluid pumped from storage tank 302, through pump 308, through siphon tank fill conduit 310, and into the appropriate siphon tank requiring fluid. In other aspects, the operation of system 300 can be as described with respect to FIG. 2. System 300 allows use of the siphon tanks without the added upper reservoir tanks.

FIGS. 4A–C illustrate a squeegee bucket fill system or subsystem 400 having a mechanical control linkage or linkage. System 400 illustrates one example of a mechanical embodiment of the invention. FIG. 4A includes a vertically slidable bucket mounting or mobile bracket 402 mounted to a surface 401 and having bracket guides 404. Slidable bracket 402 is coupled to a coupling member 406, which is in turn coupled to a lever arm 408 at the lever arm end 410. A spring 412 may be seen coupled to lever arm end 410, with spring 412 being attached at the upper end to a spring mount 414. A fluid supply conduit 424 may be seen coupled to a valve body 420 which is in turn coupled to a lower portion of the fluid supply conduit or squeegee bucket supply conduit 416, terminating in a port 418. In the example shown, valve body 420 includes a flow passage 422 therethrough. Passage 422 is not aligned with fluid supply conduit 424 in FIG. 4A, thereby closing the valve.

In FIG. 4A, spring 412 is fully contracted, indicating a low—low or cleaning position. As the squeegee bucket has been removed from slidable bracket 402, the bracket has been allowed to slide vertically upward because of the extremely low weight on the bracket. Spring 412 effectively pulls the mounting bracket upward. Lever arm 408 may be seen to be upwardly displaced, thereby rotating the valve body 420 and valve body passageway 422. FIG. 4A indicates the position of the system where the bucket has been removed for cleaning and flow through the fluid supply conduit is undesirable.

FIG. 4B illustrates system 400 after a squeegee bucket 430 has been added to bracket 402, but where the fluid level within squeegee bucket 430 is too low, calling for additional fluid. Spring 412 may be seen to be only partially expanded, which can rotate lever arm 408 to a substantially horizontal position, thereby aligning passageway 422 in valve body 420 with fluid supply conduit 424. Fluid is allowed to flow through valve body 420 and into bucket 430.

FIG. 4C illustrates system 400 after sufficient fluid has been added to bucket 430. The weight of the now filled bucket 430 has slid bracket 402 downward, thereby extending spring 412, moving coupling member 406 and pulling lever arm 408 further downward. Valve body 420 has been further rotated, once again bringing passageway 422 out of alignment with fluid supply conduit 424 and closing the valve.

The example of FIGS. 4A–C is but one example of how the fluid quantity sensor and controller can be implemented using mechanical devices only. The fluid quantity sensor in FIG. 4A is implemented in the slidable bracket 402 and spring 412. The controller may be viewed as implemented by the combination of spring 412, lever arm 408, and rotatable valve body 420. FIGS. 4A–4C exemplify only one of several weight triggered flow systems.

Figure 5:
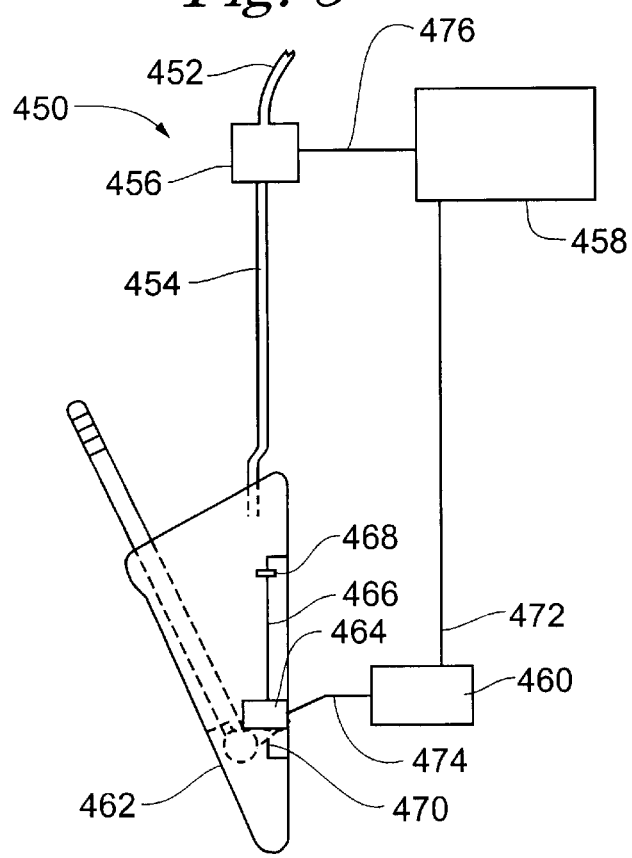
FIG. 5 is a schematic diagram of a squeegee bucket having a float switch coupled to a controller and acting as a fluid quantity sensor.

FIG. 5 illustrates a squeegee bucket fill system or subsystem 450 having an electrical or electronic control linkage or linkage. System 450 includes a fluid supply conduit 452 coupled through a valve 456 and further coupled to a squeegee bucket fluid tube 454 extending into a squeegee bucket 462. Squeegee bucket 462 includes a fluid quantity sensor embodied in a float device. System 450 includes a float 464 constrained to ride on a float guide 466 within the squeegee bucket. Float guide 466 includes a high level sensor 468 and a low level sensor 470 which can detect when float 464 has approached either limit. High-level sensor 468 and low-level sensor 470 can be implemented using mechanical or electrical means, for example, reed switches. A float switch output line 474 may be seen to connect to a float switch or sensor 460, which in turn is coupled to a controller input line 472 coupled to a controller 458. Controller 458 is further coupled through an output line 476 to valve 456. When float 460 approaches low level sensor 470, more fluid can be called for and valve 456 opened by controller 458. When high-level sensor 468 is approached, controller 458 can close valve 456. In system 450, the fluid quantity sensor therefore directly detects fluid level.

One system includes a float switch mounted inside the squeegee bucket to detect a low fluid level or lack of low level. One float switch includes a float guide having a reed switch within to complete a circuit through two wires extending out of the float guide. A donut shaped float including a magnet rides over the float guide to open and close the reed switch. The float switch can be mounted at the desired level within squeegee bucket. One suitable float switch is a miniature float switch made by Meder (Germany), being nominally ¾ inch width and 2 ½ inch height.

One system includes a 12 VDC power supply mounted on a service island canopy, with one 12 VDC line connecting to one float switch lead. The other float switch lead can be coupled to a solenoid valve, for example one made by ASCO. The other solenoid valve lead can be coupled to the other power supply lead.

Figure 6A:
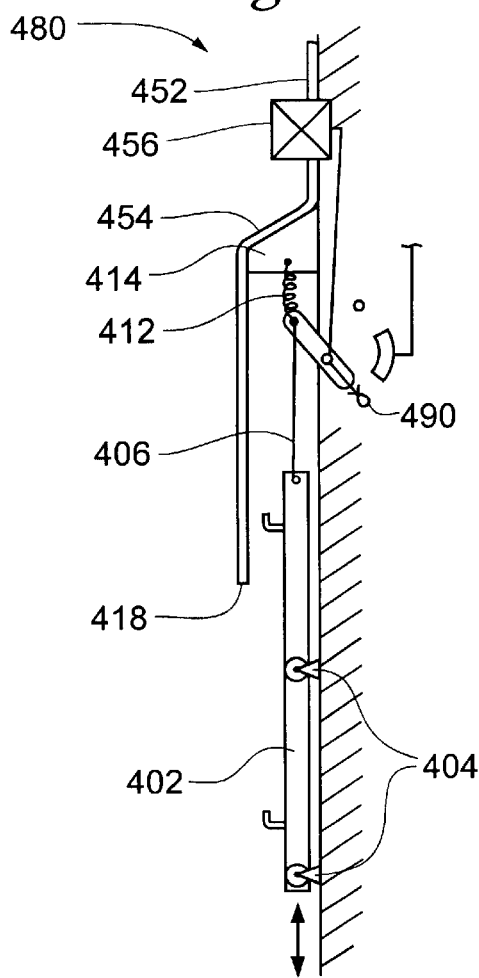
FIG. 6A is a schematic diagram of a vertically-slideable squeegee bucket-mounting bucket coupled to a spring and lever arm for electrically indicating a low level condition.
Figure 6B:
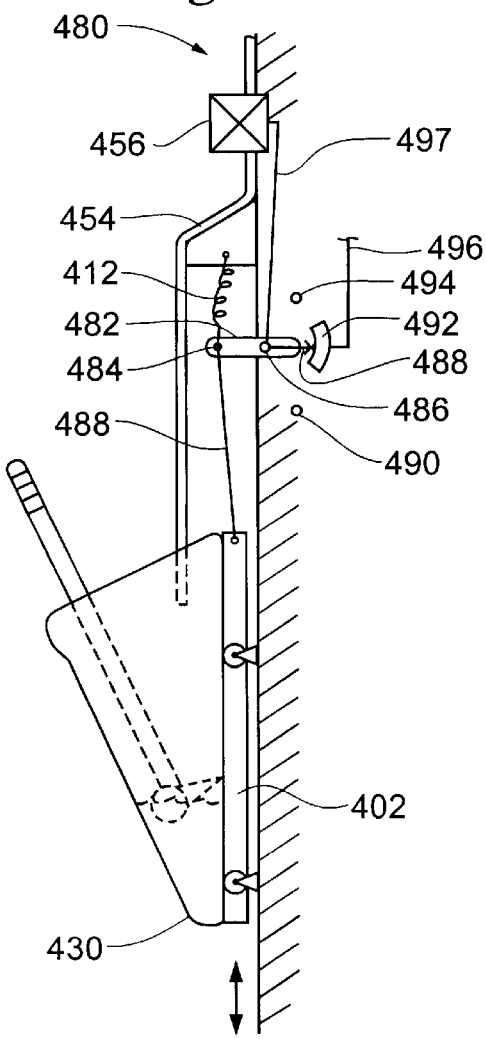
FIG. 6B is a schematic diagram of the squeegee bucket mounting bracket of 6A, having the squeegee bucket mounted on the bracket and a low fluid quantity, allowing the spring to extend and make an electrical contact to indicate a low level condition.
Figure 6C:
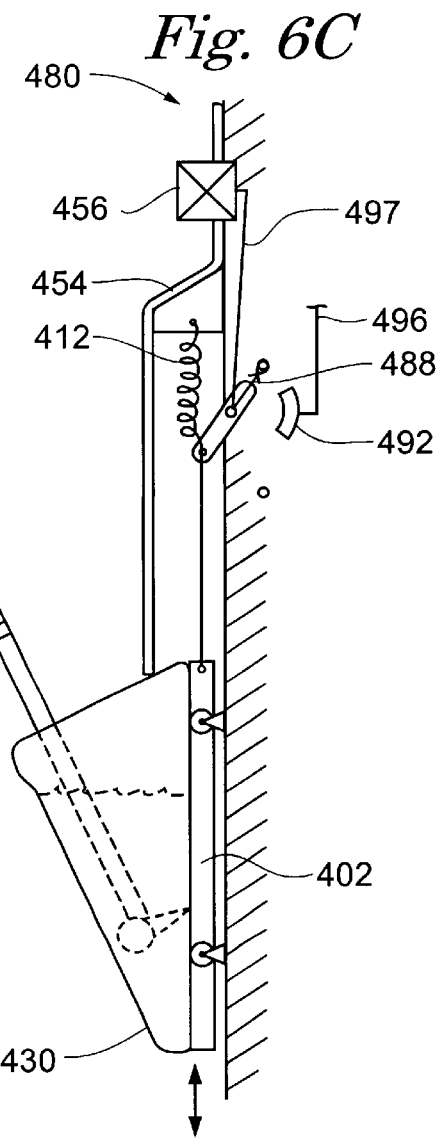

FIGS. 6A–6C illustrate another squeegee bucket fill system 480 having an electrical or electronic control linkage or linkage. System 480 is similar to some respects to system 450 of FIG. 5 and system 400 of FIGS. 4A–4C. System 480 includes a squeegee bucket inflow valve 456 and squeegee fluid supply conduits 452 and 454. System 480 is similar to system 400 of FIGS. 4A–4C in having slidable squeegee bucket bracket 402 and spring 412, as previously described. System 480 utilizes a simple electric switch to control the squeegee bucket inflow valve 456 rather than the mechanical device illustrated in FIG. 4A.

System 480 includes an electrical switch including a lever arm 482 being connected at location 484 to the lower end of spring 412. Lever arm 482 is pivotally mounted about pivot point 486 and has an electrical contact arm 488 disposed of pivot point 486 from spring connection point 484. Electrical contact arm 488 can make contact with electrical contacts 492. The electrical switch includes a low—low point 490 indicating a very low weight for the squeegee bucket indicative of a removed bucket. Contact arm 488 points to low—low point 490 in FIG. 6A. The electrical switch further has a low contact 492 indicating a squeegee bucket and fluid weight sufficiently low so as to require filling. In the embodiment illustrated, low contact 492 is arcuate and has a length so as to allow filling over a range of weight values. System 480 has electrical contact arm 488 making contact with low contact 492 in FIG. 6B. This contact is made as spring 412 has been partially extended relative to spring 412 in FIG. 6A. The electrical switch also has a high point 494, which is indicative of a sufficiently filled squeegee bucket. System 480 shows electrical contact arm 488 pointing to high point 496 in FIG. 6C. This is caused by spring 412 being fully extended, further extended relative to spring 412 in FIG. 6B. When the electrical contact arm 488 is in contact with low contact 492, a circuit can be established from a power line 496, through contact 492, through arm 488, than through second electrical line 497 to squeegee bucket inflow valve 456.

FIG. 7 illustrates another squeegee bucket fill system 500, similar in many respects to system 100 of FIG. 1B. System 500 shares many of the same elements as system 100 of FIG. 1B, which are identically numbered and need not be further described. System 500 includes a slave controller 141 coupled through a communication line 143 to controller 140. In some embodiments, the control can be distributed between a master controller and/or more slave controllers, such as controller 141. System 500 also includes a hose 508 and nozzle 510 which can be used to fill the windshield washer fluid reservoir in automobiles. Reservoir 54 includes a hose outlet conduit 502 coupled through a hose flow meter 504 which is in turn coupled to a hose valve 506 which leads to hose 508. Hose flow meter 504 can be coupled through a input communication line 505 to controller 140. Output communication line 507 can send open and shut commands from controller 140 to hose valve 506. In FIG. 7, system 500 has two sets of hoses, nozzles, meters and valves. System 500 can thus make dual use of the fill system including reservoirs 54 and 120. The system overhead and reservoirs can be used to both fill the squeegee buckets and to provide windshield washer fluid to replenish the reservoir in automobiles. In some embodiments, slave controller 141 can be coupled to money input devices to activate controller 141 for the purposes of opening valve 506 and providing washer fluid through nozzle 510.

Figure 8:
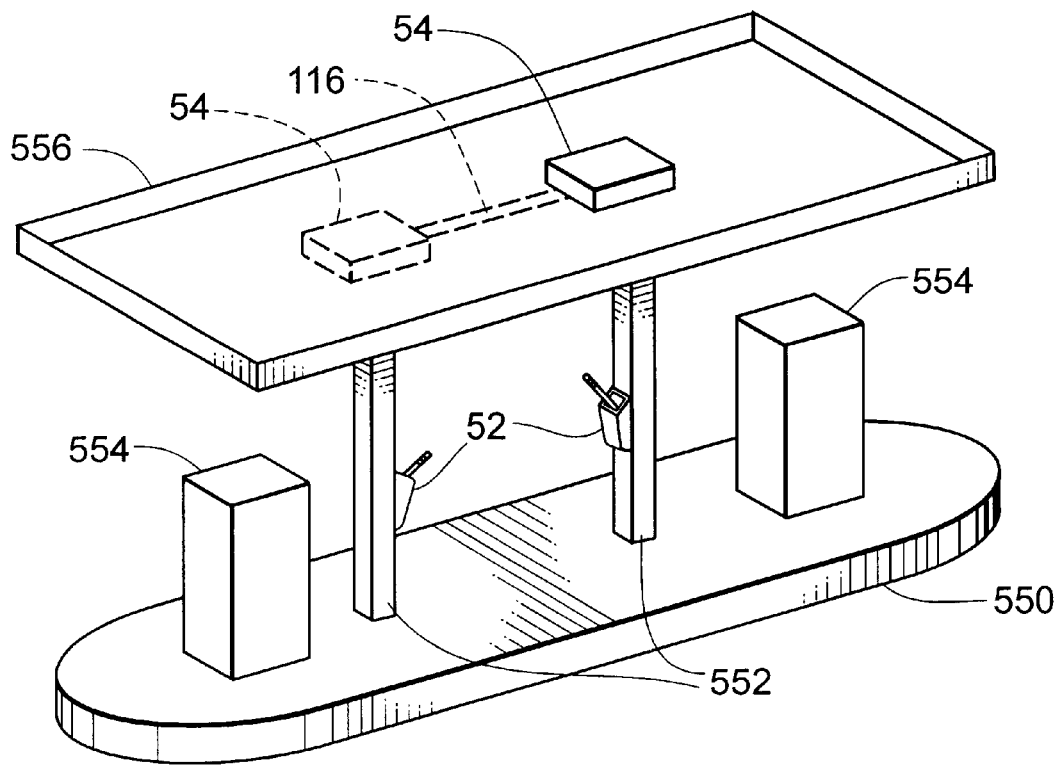
FIG. 8 is a highly diagrammatic perspective view of a gasoline station island having fluid reservoirs disposed on the island canopy.

FIG. 8 illustrates a service island 550 having fuel or gas pumps 554 thereon and support columns 552 supporting a canopy 556. Fluid reservoirs 54 are disposed on top of canopy 556 and interconnected with equalization conduit 116. Squeegee buckets 52 are mounted on support columns 552.

Figure 9:
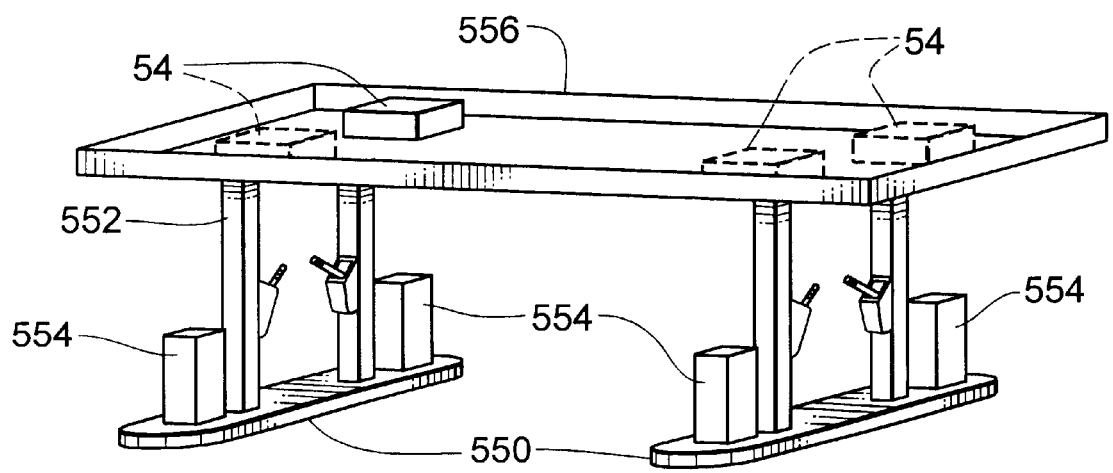
FIG. 9 is a highly diagrammatic, perspective view of two gasoline station islands having fluid reservoirs disposed on the island canopy.

FIG. 9 illustrates another use of the invention on service islands 550 having support posts 552 and canopy 556. Reservoirs 54 may be seen disposed atop canopy 556. FIG. 9 illustrates how the multiple reservoirs may be disposed on top of the canopy.

Figure 10:
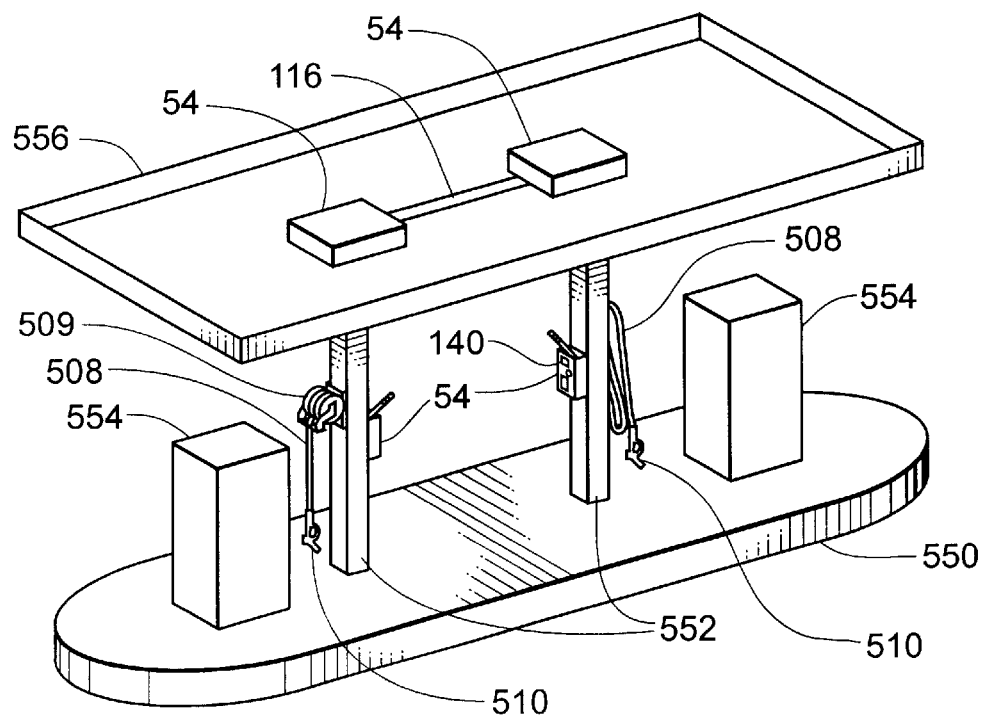
FIG. 10 is a highly diagrammatic, perspective view of a gasoline station island having fluid dispensing hoses and nozzles.

FIG. 10 illustrates another service island 550 having support posts 552 and canopy 556, where reservoirs 54 are coupled with equalization conduit 116. One support post includes a squeegee bucket 54 and hose reel 509 having hose 508 and nozzle 510 for replenishing automobile windshield washer fluid reservoirs. Another support post includes controller 140 and another squeegee bucket 54 as well as hose 508.

Figure 11:
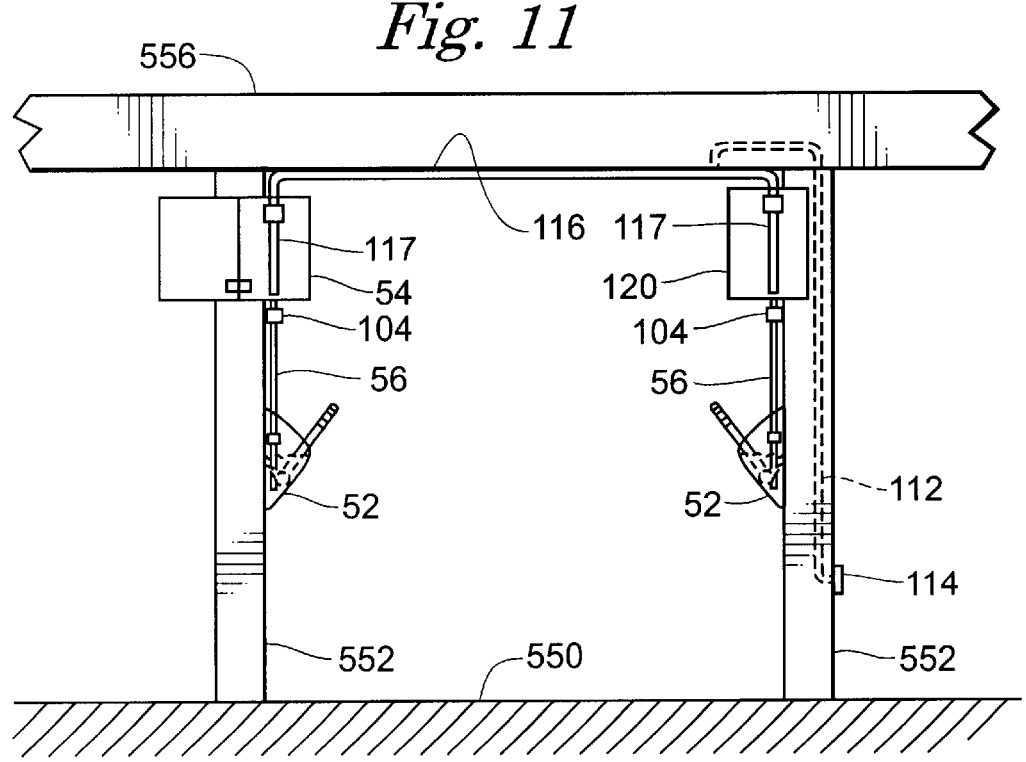
FIG. 11 is a fragmentary, highly diagrammatic side view of a gasoline station island having squeegee buckets, reservoirs, and a reservoir fill conduit.

FIG. 11 illustrates yet another service island 550 having squeegee buckets 52, substantially as illustrated in FIG. 1. Reservoir 54 and reservoir 120 are disposed beneath canopy 556 and secured to support post 552 directly. Equalization line 116 may be seen to extend down into the reservoirs through a downwardly extending conduit portion 117. The downwardly extending portion 117 allows the fluid level to be equalized effectively from the top of the reservoirs. Reservoir fill conduit 112 may also be seen.

Figure 12:
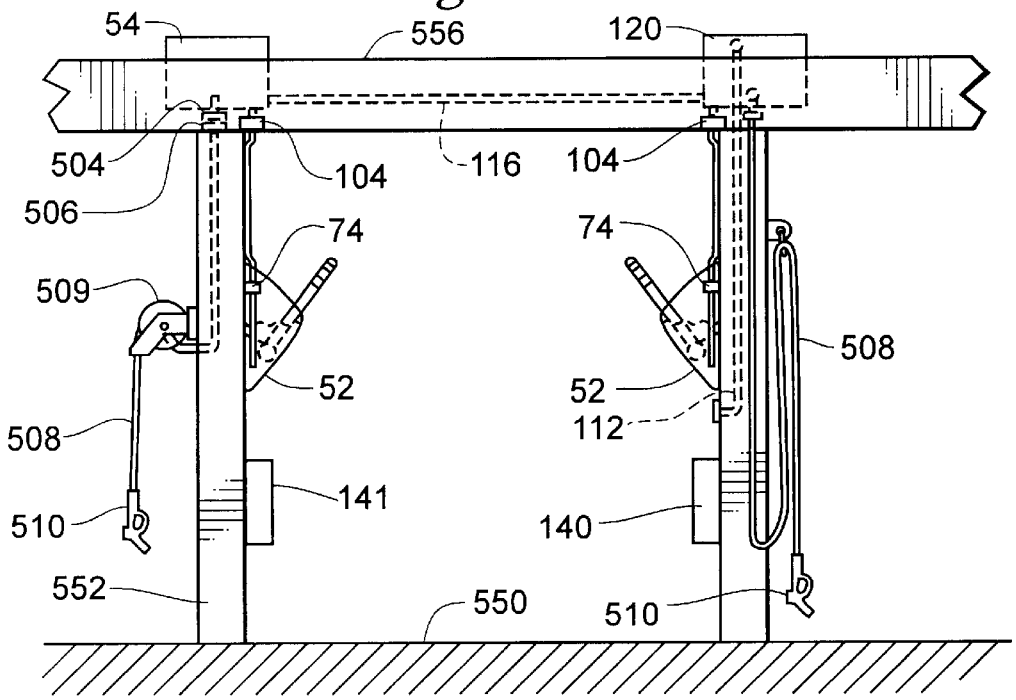
FIG. 12 is a fragmentary, highly diagrammatic side view of a gasoline station island having squeegee buckets, reservoirs, and coiled dispensing hoses and nozzles.

FIG. 12 illustrates still another service island 550 including numerous aspects previously described. Master controller 140 maybe seen as is slave controller 141. Meter 504 and valve 506 may be seen for supplying hose 508 and nozzle 510. The example of FIG. 12 shares many aspects with the example previously described in FIG. 7. Reservoir fill conduit 112 may be seen disposed within one of the support posts.

Figure 13:
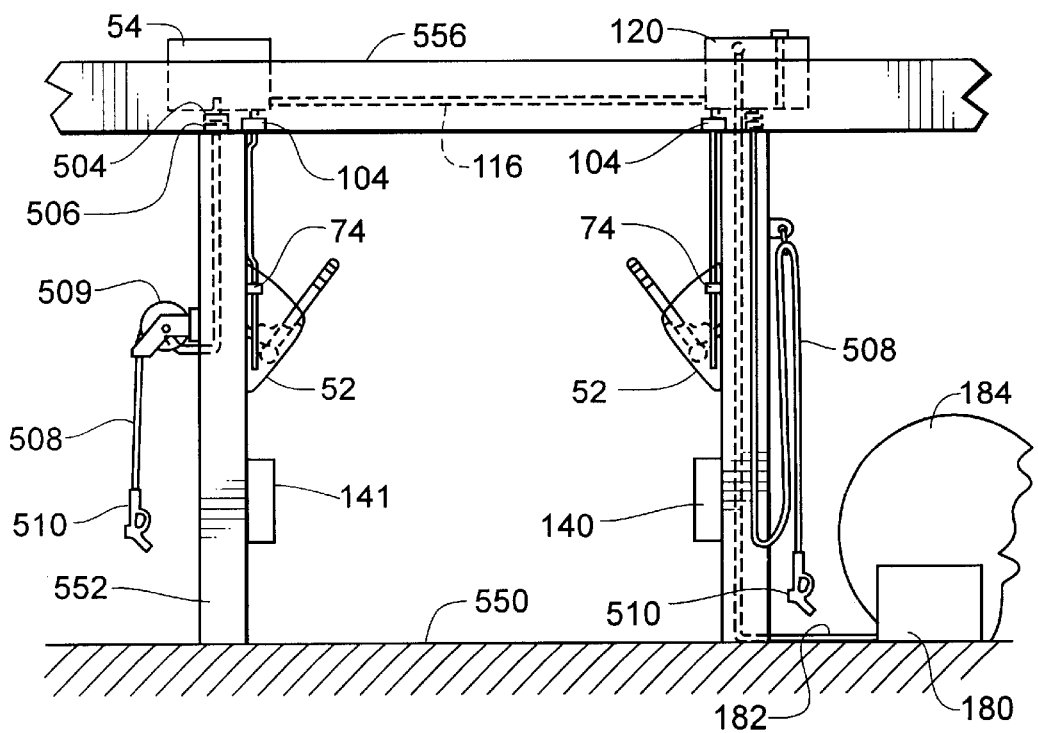
FIG. 13 is a fragmentary, highly diagrammatic side view of a gasoline station island having squeegee buckets, dispensing coils and nozzle, reservoirs, and a pump and fluid bulk storage tank.

FIG. 13 illustrates another service island 550 having aspects in common with FIG. 12 previously discussed, but having pump 180 and bulk storage tank 184 as discussed with respect to FIG. 1B. Pump 180 and bulk storage tank 184 can be used to replenish reservoirs 120 and 54.

FIG. 14 illustrates a service island 550 having master control unit 140 as well as slave control unit 141. Reservoir 184 may be seen disposed on the ground rather than hanging from the pillar or supported by the canopy. Pump 180 and reservoir 184 may be used to supply both squeegee bucket 52 and hoses 508. Pump 180 is coupled to a first hose supply conduit 582 as well as a second hose supply conduit 584. A squeegee bucket fill conduit 586 may be seen coupled to squeegee bucket 52. Reservoir 184 may also be referred to as a bulk storage tank as the embodiment of FIG. 14 has no gravity feed to squeegee bucket 52, rather being pump fed. In some embodiments, reservoir 184 may be effectively pressurized so as to provide fluid under pressure to squeegee bucket 52 without requiring the intermittent and frequent operation of the pump.

FIG. 15 illustrates another service island having reservoirs 54 and 120 together with equalization conduit 116. Reservoirs 54 and 120 may be seen mounted on support posts 552, beneath canopy 556. System 600 of FIG. 15 illustrates a system, which may require filling by directly filling reservoirs 54 and 120 by inserting a fill hose through the top of one or both reservoirs.

What is claimed is:

1. A system adapted for replenishing at least one windshield washer fluid squeegee bucket at a service island comprising:
    a squeegee bucket having an interior for holding windshield washer fluid;
    a fluid supply conduit extending above the bucket and coupleable to a fluid source;
    a valve coupled to the fluid supply conduit, the valve having a valve outlet disposed to discharge fluid into the bucket interior, the valve having an open position for discharging fluid from the fluid conduit into the bucket interior and a closed position for preventing flow from the fluid supply conduit into the bucket interior;
    a fluid quantity sensor coupled to the squeegee bucket for indicating a low fluid quantity; and
    a linkage linking the fluid quantity sensor to the valve to open the valve responsive to the low quantity indication.

2. A system as in claim 1, wherein the valve outlet discharges directly into the bucket interior.

3. A system as in claim 1, further comprising a squeegee bucket conduit having a first end operably coupled to the valve outlet and a second end extending into the bucket interior for discharging fluid into the bucket.

4. A system as in claim 1, wherein the linkage is selected from the group consisting of mechanical, electrical, pneumatic, hydraulic, binary logic, and microprocessor linkages.

5. A system as in claim 1, wherein the linkage is a mechanical linkage linking the sensor low quantity indication to open the valve.

6. A system as in claim 1, wherein the linkage is an electrical linkage linking the sensor low quantity indication to open the valve.

7. A system as in claim 1, wherein the fluid quantity sensor is a level sensor.

8. A system as in claim 7, wherein the fluid quantity sensor is a float sensor.

9. A system as in claim 8, wherein the valve is electrically actuated, the float sensor low fluid indication is electrical, and the linkage is an electrical linkage linking the low quantity indication to the valve to open the valve.

10. A system as in claim 1, wherein the valve is mechanically actuated, the float sensor low quantity indication is mechanical, and the linkage is a mechanical linkage linking the low quantity indication to open the valve.

11. A system as in claim 1, wherein the fluid quantity sensor is a weight sensor responsive to fluid weight in the bucket.

12. A system as in claim 11, wherein the valve is mechanically actuated, the weight sensor low fluid indication is a mechanical movement, and the linkage is a mechanical linkage linking the low fluid quantity indication movement to open the valve.

13. A system as in claim 1, further having a fluid reservoir disposed above the bucket and coupled to the fluid supply conduit.

14. A system adapted for replenishing at least one windshield washer fluid squeegee bucket at a service island comprising:
    a squeegee bucket having an interior for holding windshield washer fluid and having a maximum fluid level;
    a fluid supply conduit having an upper end extending above the bucket and an open lower end extending into the bucket below the maximum fluid level; and
    a fluid reservoir elevated above the bucket, the reservoir including an outlet coupled to the fluid conduit upper end and an inlet closeable to the atmosphere, such that fluid dropping below the fluid conduit lower end while the vessel contains fluid and the reservoir inlet is closed allows air to flow upward into the reservoir through the conduit while allowing fluid to flow downward through the conduit into the bucket to cover the fluid conduit lower end.

15. A system adapted for replenishing windshield washer squeegee buckets at a service island comprising:
    a squeegee bucket having an interior;
    means for sensing a low fluid quantity in the bucket;
    means for gravity feeding windshield washer fluid into the bucket; and
    means for linking the means for sensing low fluid quantity to the means for gravity feeding so as to discharge fluid into the bucket responsive to the sensed low fluid quantity in the bucket.

16. A system as in claim 15, wherein the means for sensing includes a float sensor and the means for gravity feeding includes fluid reservoir elevated above the bucket and a valve operably coupled to control fluid flow from the reservoir.

17. A system as in claim 15, wherein the means for sensing includes a float sensor having an electrical output, and the means for gravity feeding includes a reservoir elevated above the bucket and an electrically actuated valve operably coupled to control fluid flow from the reservoir, wherein the linking means includes means for electrically linking the float sensor to the valve to discharge fluid into the bucket responsive to the low fluid quantity.

18. A system as in claim 15, wherein the bucket has a maximum fluid level, wherein the means for gravity feeding includes a reservoir which can be closed to the atmosphere and is elevated above the bucket, wherein the means for gravity feeding further includes a fluid conduit extending from the reservoir downward to below the bucket maximum fluid level and having a lower conduit port disposed below the bucket maximum fluid level, wherein the means for sensing low fluid quantity includes the fluid dropping below the lower conduit port to expose the port, wherein the means for linking includes air entering the exposed port to flow upward into the closed reservoir to allow fluid to flow downward through the conduit into the bucket.

19. A system to maintain a prescribed level of windshield washer fluid in at least one windshield washer fluid squeegee bucket, wherein each squeegee bucket is individually gravity fed from an elevated reservoir containing windshield washer fluid.

20. A system as in claim 19, wherein the amount of fluid dispensed from the elevated reservoir into the squeegee bucket is metered.

21. A system as in claim 19, wherein the elevated reservoir is shared with a system to refill the windshield washer fluid reservoir in an automobile.

22. A system as in claim 19, wherein the system includes a control valve is sensitive to the weight of the weight of fluid in the windshield washer squeegee bucket, the valve shutting off the fluid flow when a prescribed weight has been exceeded.

23. A system adapted for supplying windshield washer fluid to a squeegee bucket at a service island, the system comprising:
a squeegee bucket including an interior for holding windshield washer fluid;
a fluid quantity sensor operably coupled to the squeegee bucket for indicating low fluid quantity in the squeegee bucket;
a controllable fluid supply valve in fluid communication with the squeegee bucket interior and being coupleable to a fluid supply source for providing windshield washer fluid to the valve;
a control linkage linking the fluid low quantity sensor to the valve, wherein the control linkage causes the valve to open and supply fluid into the squeegee bucket interior responsive to the fluid quantity outputting a low fluid quantity signal, wherein the control linkage is selected from the group consisting of electrical, mechanical, pneumatic, hydraulic, binary logic, and microprocessor linkages.

24. A system as in claim 23, wherein the fluid quantity sensor is a level sensor.

25. A system as in claim 24, wherein the level sensor is a discreet sensor which changes signal upon the fluid level in the squeegee bucket reaching a low level.

26. A system as in claim 25, wherein the level sensor includes a float disposed to float on fluid within the squeegee bucket interior, wherein the float triggers a signal change upon the fluid level reaching a low level.

27. A system as in claim 23, wherein the valve has an output and the system includes a fluid supply tube coupled to the valve output with the fluid supply tube having at least one opening disposed within the squeegee bucket interior.

28. A system as in claim 23, wherein the valve is a binary valve having an open position and a closed position, wherein the control linkage opens the valve when the fluid quantity sensor indicates a low fluid level.

29. A system as in claim 23, wherein the system is configured to deliver a predetermined quantity of fluid responsive to a low fluid quantity sensed by the fluid quantify sensor.

30. A system as in claim 29, wherein the control linkage is an electrical linkage which executes logic upon receiving a low fluid quantity signal from the fluid quantify sensor, wherein the control linkage opens the valve for a fixed time period to allow a fixed time period of fluid flow through the valve and into the squeegee bucket interior.

31. A system as in claim 23, wherein the flow quantity sensor includes a float having a magnetic portion and a reed switch disposed to be triggered by the magnetic float portion when the fluid quantity reaches a preset low level.

32. A system adapted for supplying windshield washer fluid to squeegee buckets at, the system comprising:
a squeegee bucket including an interior for holding windshield washer fluid;
a fluid quantity sensor operably coupled to the squeegee bucket for indicating low fluid quantity in the squeegee bucket;
a fluid supply conduit operably coupled to the squeegee bucket and in fluid communication with the squeegee bucket interior;
a fluid supply source operably coupled to the fluid supply conduit for providing windshield washer fluid to the fluid supply conduit; and
a controller having an input coupled to the fluid quantity sensor and an output operably coupled to at least one of the fluid supply conduit and fluid supply source, wherein the controller output causes fluid to be supplied to the squeegee bucket through the fluid supply conduit responsive to a low fluid quantity indication from the fluid quantity sensor.

33. A system as in claim 32, wherein the fluid supply source includes a pump in fluid communication with the fluid supply conduit.

34. A system as in claim 33, wherein the controller output is operably coupled to the pump.

35. A system as in claim 32, wherein the fluid supply source includes a fluid reservoir coupled to the fluid supply conduit disposed to gravity feed the squeegee bucket.

36. A system as in claim 35, further comprising a valve coupled to the fluid supply conduit to allow fluid to flow through the conduit in a first position and to preclude fluid flow through the conduit in a second position.

37. A system as in claim 36, wherein the controller output is operably coupled to the valve to open and close the valve.

38. A system as in claim 35, further comprising a bulk storage vessel in fluid communication with the reservoir.

39. A system as in claim 32, wherein the system has at least two fluid reservoirs connected to each other with a equalization conduit to substantially equalize the upper fluid levels in the at least two reservoirs.

40. A system as in claim 32, wherein the fluid quantity sensor is a weight sensor.

41. A system as in claim 40, wherein the weight sensor senses the combined weight of the squeegee bucket and the fluid in the squeegee bucket interior.

42. A system as in claim 40, wherein the weight sensor outputs a continuous range of fluid weights.

43. A system as in claim 40, wherein the weight sensor outputs a discrete indication of fluid weight.

44. A system as in claim 40, wherein the weight sensor includes a spring, wherein the spring is coupled to the squeegee bucket and has a length which changes as a function of bucket fluid weight, wherein the system includes a valve, the valve being in fluid communication with the fluid supply conduit, such that a low fluid weight allows the squeegee bucket to rise, wherein the spring is operably coupled to the valve to allow fluid flow through the valve when the low fluid weight in the squeegee bucket changes the spring length.

45. A system as in claim 43, wherein the controller includes a lever arm operably coupled to the spring and the valve such that spring contraction urges the lever arm to open the valve.

46. A system as in claim 32, wherein the fluid quantity sensor is a level sensor.

47. A system as in claim 46, wherein the level sensor outputs a continuous range of fluid levels.

48. A system as in claim 47, wherein the fluid level sensor outputs a discrete indication of low fluid level.

49. A system as in claim 48, wherein the level sensor is a float sensor.

50. A system as in claim 48, wherein the fluid sensor is a conductivity sensor.

51. A system as in claim 32, wherein the controller initiates fluid flow upon indication of low fluid quantity from the fluid quantity sensor.

52. A system as in claim 51, wherein the controller terminates fluid flow on sensing a not low fluid quantity indication from the fluid quantity sensor.

53. A system as in claim 51, wherein the controller terminates the fluid flow upon passage of a preset fluid volume into the squeegee bucket.

54. A device as in claim 51, wherein the controller terminates the fluid flow into the squeegee bucket after passage of a preset flow time interval.

* * * * *